(12) United States Patent
Miller

(10) Patent No.: US 11,413,999 B2
(45) Date of Patent: Aug. 16, 2022

(54) CONTAINER HOLDER RETENTION DEVICE

(71) Applicant: Jonathan Miller, Concord, CA (US)

(72) Inventor: Jonathan Miller, Concord, CA (US)

( * ) Notice: Subject to any disclaimer, the term of this patent is extended or adjusted under 35 U.S.C. 154(b) by 34 days.

(21) Appl. No.: 16/866,421

(22) Filed: May 4, 2020

(65) Prior Publication Data
US 2020/0376998 A1 Dec. 3, 2020

Related U.S. Application Data

(60) Provisional application No. 62/843,160, filed on May 3, 2019.

(51) Int. Cl.
*B60N 3/00* (2006.01)
*B60N 3/10* (2006.01)

(52) U.S. Cl.
CPC .................. *B60N 3/108* (2013.01)

(58) Field of Classification Search
None
See application file for complete search history.

(56) References Cited

U.S. PATENT DOCUMENTS

| | | | | |
|---|---|---|---|---|
| 6,715,726 B1 * | 4/2004 | Dybalski | ............... | B60N 3/102 224/926 |
| 8,353,495 B2 * | 1/2013 | Ogura | .................... | B60N 3/106 248/311.2 |
| 8,783,635 B2 * | 7/2014 | Kamiya | ................. | B60N 3/106 248/311.2 |
| 9,004,332 B2 * | 4/2015 | Kodama | ............... | B60N 3/106 224/544 |
| 10,596,947 B2 * | 3/2020 | Smithson | ........... | A47G 23/0216 |
| 2005/0218149 A1 * | 10/2005 | Walsh | .................... | B44D 3/127 220/737 |
| 2009/0117239 A1 * | 5/2009 | Bunn | .................. | A47J 31/0689 426/433 |

\* cited by examiner

*Primary Examiner* — Steven M Marsh
(74) *Attorney, Agent, or Firm* — West & Associates, A PC; Stuart J. West; Charlotte Rodeen-Dickert

(57) ABSTRACT

A cup holder insert having a retainer housing having front and rear surfaces which define an opening bounded by the perimeter of said retainer housing and a spring-biased retention element, further comprising at least one support section and at least one tab section extending substantially orthogonal to each other. The at least one support section is coupled with the retainer housing with tab extending from the opening substantially perpendicularly to said front surface of the retainer housing. In some embodiments, a flap can selectively cover the tab section.

17 Claims, 2 Drawing Sheets

CONTAINER HOLDER RETENTION DEVICE

CROSS-REFERENCE TO RELATED APPLICATIONS

This application claims the benefit if priority to under 35 U.S.C. § 119 to prior filed and provisional patent application Ser. No. 62/843,160, filed May 3, 2019 by Jonathan Miller, the entirety of which is hereby incorporated herein by reference.

BACKGROUND

Technical Field

The present device relates to the field of container holding devices, particularly container holders in vehicles, such as those for beverages.

BACKGROUND

While cup holders are modernly ubiquitous in automobiles, marine vehicles, stadium seating, golf carts, strollers, universal cup holders adapters and numerous other items, they are not all created equal, even in the same vehicle. In lower-end vehicles and cup holders that are not in the center console of most vehicles, the cup holders generally consist only of a round opening and potentially one or more pieces of neoprene rubber (or other material) extending inwardly from the perimeter of the opening. Such cup retention systems are not particularly effective in securing a cup within the opening. A cup holder cannot generally be replaced in vehicles without replacing an entire console and dealers and after-market suppliers do not offer good options to better secure cups within cupholders. What is needed is a container holder retention device that can be fitted with an existing cupholder opening to better secure a cup within the cupholder.

SUMMARY

The present device comprises a spring biased retention element configured to have at least one support member and an orthogonal tab member. Support members can be coupled to a frame, while a tab member can protrude forward through an opening in a frame and coupled with a flap member. An adhesive member can be coupled to the rear side of a frame to allow the device to be affixed to the interior side wall of a container holder. When container is inserted into the holder, a flap is pushed down and maintains contact with the side of a container while held in place with the tension produced by a spring-biased retention element, thus preventing containers from moving about in the holder.

BRIEF DESCRIPTION OF THE DRAWINGS

Further details of the present device are explained with the help of the attached drawings in which.

DETAILED DESCRIPTION

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Figure 1:
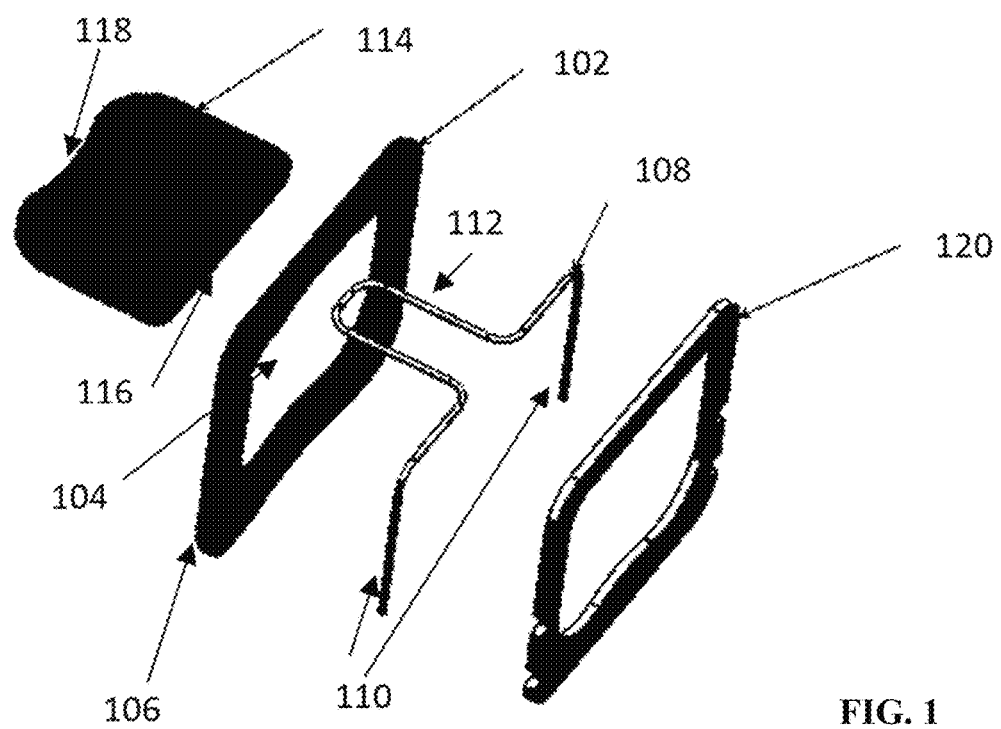
FIG. 1 depicts a perspective expanded view of an embodiment of the present device.

FIG. 1 depicts a perspective expanded view of an embodiment of the present device. In some embodiments, a retainer housing 102 can be substantially planar and have an opening 104 to define a frame. As shown in FIG. 1, a retainer housing 102 and opening 102 can be substantially rectangular, and can have radiused corners, but in other embodiments can be any other known and/or convenient geometry. In the embodiment shown, an opening 104 can be substantially aligned with a retainer housing 102 along a central lateral and longitudinal axis, but in other embodiments can be aligned in any other known and/or convenient arrangement. In some embodiments, a raised edge 106 can run along all or any part of the perimeter edge of a retainer housing 102. In some embodiments, a retainer housing 102 and raised edge 106 can be comprised of a polymer, plastic, metal, wood, or any other known and/or convenient substantially rigid or flexible material. In some embodiments, the retainer housing 102 can be comprised of material and configured such as it can conform to the interior curvature of a desired cup holder and/or engage a flat surface.

As shown in FIG. 1, a spring biased retention element 108 can be configured to have at least one support section 110 and at least one tab section 112 protruding substantially orthogonally to a support section 110. In the embodiment shown in FIG. 1, a spring biased retention element 108 can be formed from an elongated segment, wherein each end can be bent at approximately 90-degrees, or any other known and/or convenient angle, and a portion of a resulting middle segment formed into a substantially rectangular section extending substantially orthogonally to bent ends. However, in other embodiments, an elongated segment can be formed into any other known and/or convenient geometrical configuration. In some embodiments, a spring-biased retention element can be formed from metal, such as, but not limited to stainless steel, or a polymer, or any other known and/or convenient material.

As shown in FIG. 1, a spring-biased retention element 108 can be coupled with a retention housing 102 such that at least one supporting member 110 can selectively engage with an edge of a retention housing 102. In the embodiment shown in FIG. 1, supporting members 110 can be positioned along opposite edges of a retention housing 102 and can selectively engage with adjacent raised edges 106, but in other embodiments can be positioned in any other known and/or convenient position.

In such embodiments, a tab section 112 can protrude through an opening 104. As shown in FIG. 1, a tab section 112 can be oriented to protrude substantially orthogonal to and adjacent to the edge of an opening 104. However, in other embodiments, a tab section 112 can protrude through an opening 104 in any known and/or convenient orientation.

As shown in FIG. 1, a flap 114 can have a substantially planar rectangular geometry, but in other embodiments can have any other known and/or convenient geometry. In some embodiments, a flap 114 can have a proximal edge and a distal edge. In the embodiment shown in FIG. 1, a proximal edge can have an opening 116 located long the thickness of a flap 114, and a distal edge can have a curved or arced section 118. An opening 116 can be configured to selectively engage with a tab section 112. In the embodiment shown, a curved section 118 can be concave and have a radius compatible with that of a beverage cup, but in other embodiments can have any other known and/or convenient geometry. In some embodiments, a flap 114 can be comprised of a polymer, textile, metal, or any other known and/or convenient material.

In some embodiments an adhesive component 120 can be placed adjacent to the rear surface of a retainer housing 102. In such embodiments, an adhesive component 120 can be placed to cover support sections 110 and selectively engage with raised edges 106 of a retainer housing 102. An adhesive component 120 can be adhesive on either the outward facing surface or both the inward and outward facing surfaces. In some embodiments, an adhesive component 120 can be comprised of a material that provides permanent, semi-permanent, removable, or any other known and/or convenient adhesive properties. Additionally, in some embodiments the adhesive component 120 can have a single prescribed thickness to accommodate the internal curvature of one or more prescribed cup holders. However, in alternate embodiments, the adhesive component 120 can have a variable thickness such that is accomodates the internal curvature of one or more prescribed cup holders. In yet further alternate embodiments, there can be multiple adhesive components 120 with various thickness and/or geometries such that a user can select a desired adhesive component 120.

Figure 2A:
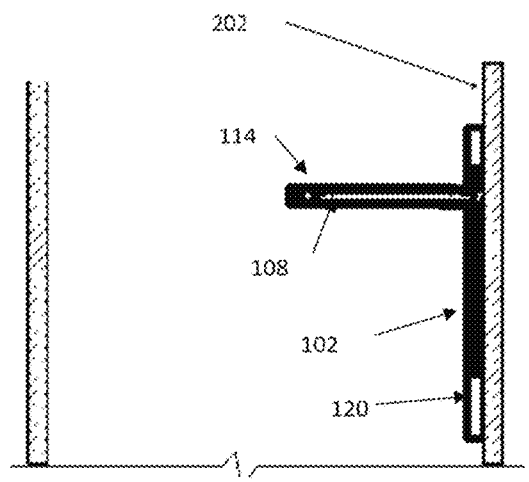
FIG. 2a depicts a cross-section side view of an embodiment of the present device.

FIG. 2a depicts side view, cross-section of an embodiment of the present device in use installed in a cup holder. In some embodiments, a surface of an adhesive component 120 can be placed adjacent to the interior wall 202 of a container holder in a vehicle to hold the device in place. In a starting position, as shown in FIG. 2a, a tab section 112 of a spring-biased retention element 103 can be in a neutral position, extending substantially perpendicular to a retainer housing 102 and a container holder's interior wall 202.

Figure 2B:
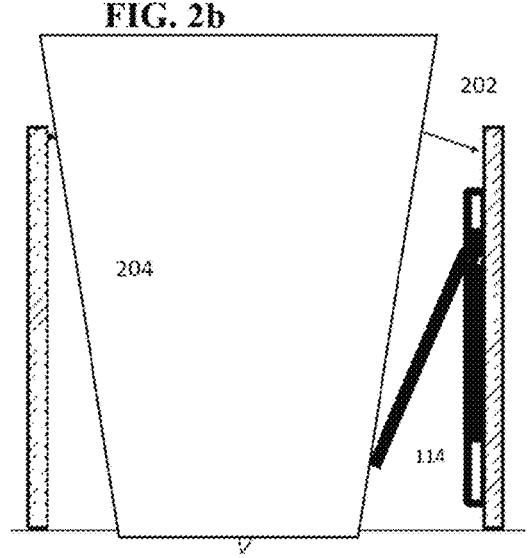
FIG. 2b depicts a cross-section side view of an embodiment of the present device in use.

In use, as shown in FIG. 2b, a container, such as a cup or other beverage container 204 can be inserted into a holder, pushing a flap 114 downward. A spring biased retention member 108 can be then placed in a tensioned position, holding a flap 114 in contact with a cup 204. In the embodiment shown in FIG. 2b, a flap 114 and tab 118 can maintain a substantially linear configuration, but in other embodiments, a flap 114 and tab 118 can curve to form an arced member under additional tension. In some embodiments, a flap 114 can have a contoured geometry to maintain more contact with a cup 204, thus more firmly holding it in place by providing an additional lateral and shear force on a cup 204. Further, a spring biased retention member 108 and flap 114 can also take up extra space in a container holder to push a cup 204 into tighter contact with other regions of a cup holder's interior wall 202, thus providing additional frictional forces on a cup 204.

Figure 3:
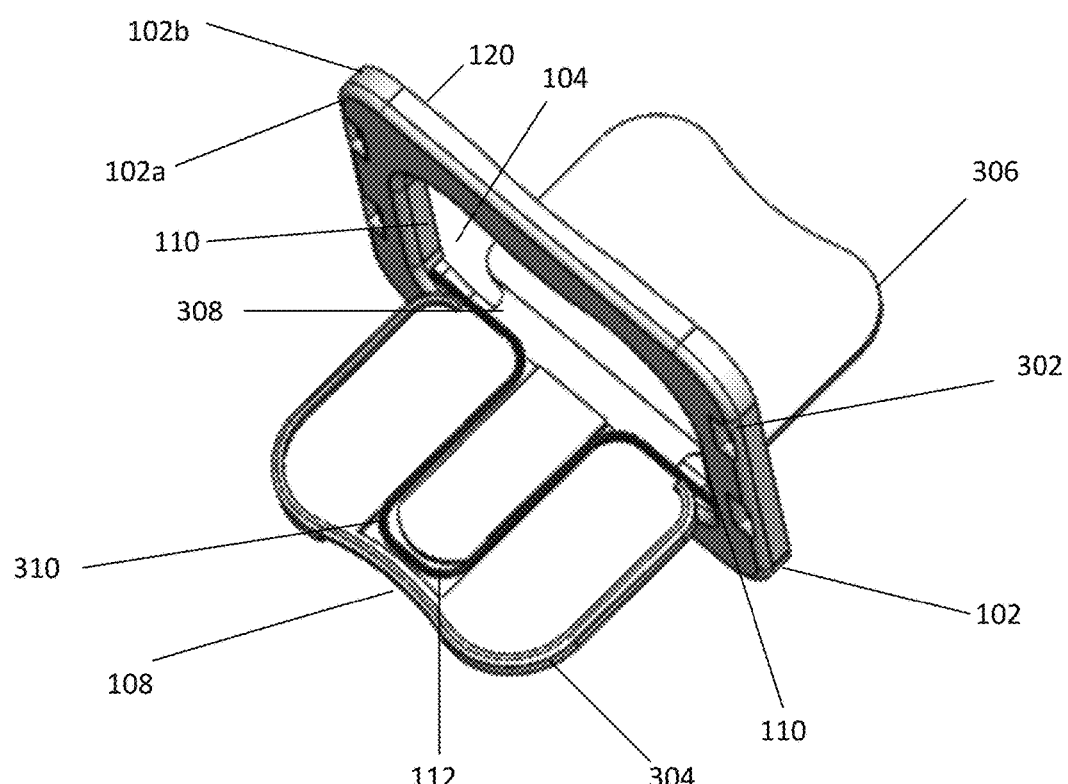
FIG. 3 depicts a bottom, open view of an alternate embodiment of the present device.
Figure 4:
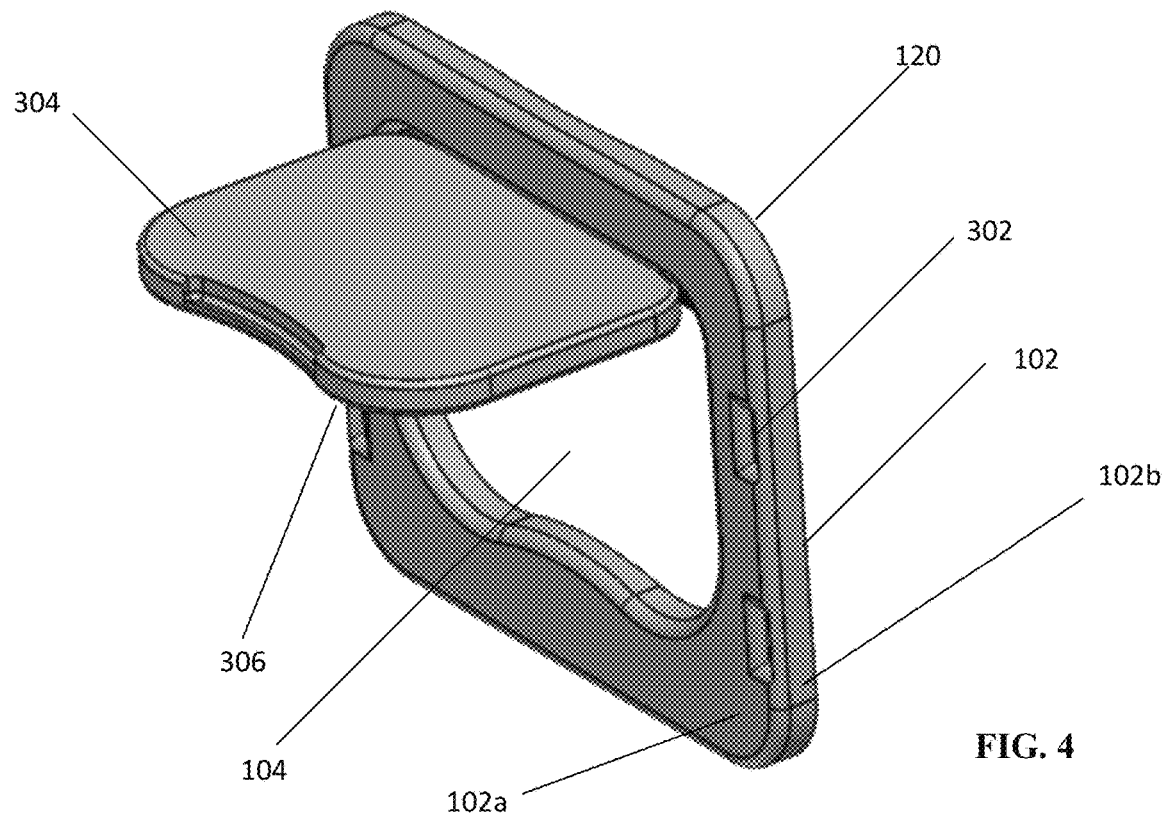
FIG. 4 depicts an isometric view of the alternate embodiment depicted in FIG. 3.

FIG. 3 depicts a bottom, open view of an alternate embodiment of the present device and FIG. 4 depicts an isometric view of the alternate embodiment depicted in FIG. 3. In the embodiment depicted in FIGS. 3 and 4 and in some embodiments, a retainer housing 102 can be substantially planar and have an opening 104 to define a frame. As shown in FIGS. 3 and 4, a retainer housing 102 and opening 104 can be substantially rectangular, and can have radiused corners, however, in alternate embodiments can be any other known and/or convenient geometry. In the embodiment shown, an opening 104 can be substantially aligned with a retainer housing 102 along a central lateral and longitudinal axis, but in other embodiments can be aligned in any other known and/or convenient arrangement. In some embodiments, a raised edge 106 can run along all or any part of the perimeter edge of a retainer housing 102. In some embodiments, a retainer housing 102 and raised edge 106 can be comprised of a polymer, plastic, metal, wood, or any other known and/or convenient substantially rigid or flexible material. Additionally, the retainer housing 102 can have a prescribed thickness and/or can be comprised of one more components 102a, 102b which can be selectively couplable via one ore more snap mechanisms 302 and/or via any known, convenient and/or desired fastening mechanism. In some embodiments, the retainer housing 102 can be comprised of material and configured such as it can conform to the interior curvature of a desired cup holder and/or engage a flat surface.

As shown in FIGS. 3 and 4, a spring biased retention element 108 can be configured to have at least one support section 110 and at least one tab section 112 protruding substantially orthogonally from the at least one support section 110. In the embodiment shown in FIGS. 3 and 4, a spring biased retention element 108 can be formed from an elongated segment, wherein each end can be bent at approximately 90-degrees, or any other known and/or convenient angle, and a portion of a resulting middle segment formed into a substantially rectangular section extending substantially orthogonally to bent ends. However, in other embodiments, an elongated segment can be formed into any other known and/or convenient geometrical configuration. In some embodiments, a spring-biased retention element can be formed from metal, such as, but not limited to stainless steel, or a polymer, or any other known and/or convenient material.

As depicted in FIGS. 3 and 4, a spring-biased retention element 108 can be coupled within the retention housing 102, between the one or more components 102a 102b, such that at least one supporting member 110 can selectively engage with an edge of a retention housing 102.

In the embodiment depicted in FIGS. 3 and 4, a tab section 112 can protrude through an opening 104. As shown in FIGS. 3 and 4, a tab section 112 can be oriented to protrude substantially orthogonal from and adjacent to the edge of an opening 104 and engage a complimentary slot 310 in a first flap 304 flexibly coupled with the retention housing 102. In the embodiment depicted in FIGS. 3 and 4, a second flap 306 can be flexibly coupled with the retention housing 102. In some embodiments, the attachment of the flaps 304 306 to the retention housing 102 via a flexible or "living" hinge 308 comprised of thinned material that is the same as the body of the retention housing 102. The first and second flaps 304 306 can then be closed and coupled around and contain the tab section 112. However, in other embodiments, a tab section 112 can protrude through an opening 104 in any known and/or convenient orientation. In some embodiments, the flaps 304 306 and the hinge 308 can be comprised of a polymer, textile, metal, or any other known and/or convenient material.

In some embodiments an adhesive component 120 can be placed adjacent to the rear surface of a retainer housing 102. In such embodiments, an adhesive component 120 can be placed to cover support sections 110 and selectively engage with raised edges 106 of a retainer housing 102. An adhesive component 120 can be adhesive on either the outward facing surface or both the inward and outward facing surfaces. In some embodiments, an adhesive component 120 can be comprised of a material that provides permanent, semi-permanent, removable, or any other known and/or convenient adhesive properties. Additionally, in some embodiments the adhesive component 120 can have a single prescribed thickness to accommodate the internal curvature of one or more prescribed cup holders. However, in alternate embodiments, the adhesive component 120 can have a variable thickness such that is accommodates the internal curvature of one or more prescribed cup holders. In yet further alternate embodiments, there can be multiple adhesive components 120 with various thickness and/or geometries such that a user can select a desired adhesive component 120.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Additionally, it should be readily understood that the apparatus disclosed herein is ubiquitous to all cupholders in all installations, not just to cupholders within vehicles. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. A container holder support device, comprising:
    a retainer housing having a front surface and a rear surface defining an opening through said front and rear surfaces and a raised edge along at least a portion of a perimeter of said retainer housing;
    a spring-biased retention element, further comprising at least one support section and at least one tab section extending substantially orthogonal to each other, said at least one support section being coupled with said retainer housing and said at least one tab section extending from said opening substantially perpendicularly to said front surface of said retainer housing;
    a flap selectively coupled with said at least one tab section; and
    a concave region substantially along at least a portion of a distal edge of said flap.

2. The container holder support device of claim 1 wherein said spring-biased retention element is formed from an elongated segment.

3. The container holder support device of claim 1 wherein said spring-biased retention element is formed from metal.

4. The container holder support device of claim 3 wherein said spring-biased retention element is formed from stainless steel.

5. The container holder support device of claim 1 wherein said spring-biased retention element is formed from a polymer.

6. The container holder support device of claim 1 wherein said spring-biased retention element is coupled with a retention housing such that said at least one support section selectively engages with an edge of said retention housing.

7. The container holder support device of claim 6 wherein said ate least one supporting section is positioned along an edge of said retention housing.

8. The container holder support device of claim 7 wherein said ate least one supporting section is positioned along an opposite edge of said retention housing.

9. The container holder support device of claim 1 comprising an adhesive component.

10. The container holder support device of claim 9 wherein the adhesive component has a variable thickness.

11. The container holder support device of claim 9 wherein said adhesive component is adhesive on an outward facing surface.

12. The container holder support device of claim 11 wherein said adhesive component is adhesive on an inward facing surface.

13. The container holder support device of claim 12 wherein the adhesive component has a variable thickness.

14. The container holder support device of claim 9, wherein said adhesive component is positioned adjacent to a rear surface of said retainer housing.

15. The container holder support device of claim 12 wherein said adhesive component is adhesive on an outward facing surface.

16. The container holder support device of claim 13 wherein said adhesive component is adhesive on an inward facing surface.

17. The container holder support device of claim 16 wherein the adhesive component has a variable thickness.

* * * * *